United States Patent [19]

Emmons et al.

[11] 4,141,868
[45] * Feb. 27, 1979

[54] WATER-BASED COATING COMPOSITIONS

[75] Inventors: William D. Emmons, Huntingdon Valley; Kayson Nyi, Sellersville, both of Pa.

[73] Assignee: Rohm and Haas Company, Philadelphia, Pa.

[*] Notice: The portion of the term of this patent subsequent to Jun. 27, 1995, has been disclaimed.

[21] Appl. No.: 806,572

[22] Filed: Jun. 14, 1977

Related U.S. Application Data

[63] Continuation-in-part of Ser. No. 703,348, Jul. 7, 1976, Pat. No. 4,097,677.

[51] Int. Cl.$^2$ .............................................. C08L 91/00
[52] U.S. Cl. ........................ 260/23 AR; 260/23 XA; 260/23 H; 260/23.7 A; 260/29.6 RB; 260/29.6 RW; 260/29.7 UA; 260/29.7 W; 526/282; 526/283; 260/45.9 L
[58] Field of Search ............ 260/23 EM, 45.9, 45.9 L, 260/23 AR, 23 XA, 23 H, 23.7 A, 29.6 RB, 29.6 RW, 29.7 UA, 29.7 W; 526/282, 283

[56] References Cited

U.S. PATENT DOCUMENTS

| | | | |
|---|---|---|---|
| 2,393,609 | 1/1946 | Bruson | 260/611 F |
| 3,575,904 | 4/1971 | Clarke | 260/23 |
| 3,650,669 | 3/1972 | Osborn et al. | 204/159.19 |
| 3,956,217 | 5/1976 | Gazeley | 260/29.7 E |
| 4,033,920 | 7/1977 | Isozaki et al. | 260/29.6 H |

OTHER PUBLICATIONS

The Journal of the Amer. Chem. Soc. vol. 68, pp. 8–10, (1946), Bruson et al.

*Primary Examiner*—Melvyn I. Marquis

[57] ABSTRACT

The present invention is concerned with film-forming polymer dispersions, especially in aqueous systems, such as aqueous solutions of polymers of monoethylenically unsaturated monomers as well as latices or dispersions in an aqueous medium of water-insoluble particles of polymers, such as those obtained by emulsion polymerization. It involves the addition to such aqueous polymer systems in order to improve hardness, blocking-resistance, print-resistance and film-formation to yield coherent films at room temperature or below, of a non-volatile, reactive monomer comprising a (meth)acrylic acid ester of a monohydroxy diolether of dicyclopentenyl alcohol to serve as an air-curing coalescent.

The designation (meth)acrylic acid is intended to refer to either acrylic acid or methacrylic acid and also generically to both. Similarly, (meth)acrylate, if and when used in the specification and claims herein, is intended to generically refer to an "acrylate" and a "methacrylate".

15 Claims, No Drawings

WATER-BASED COATING COMPOSITIONS

This is a continuation-in-part of U.S. Ser. No. 703,348 filed July 7, 1976 now U.S. Pat. No. 4,097,677.

DESCRIPTION OF THE INVENTION

In the use of aqueous dispersions of emulsion polymers, the particles of which are water-insoluble, the effectiveness of the dispersion in forming a film after the polymer dispersion has been coated upon a surface to be painted depends upon the glass transition temperature of the dispersed polymer and the temperature at which the coating is allowed to dry. This is particularly well pointed out in the Conn et al U.S. Pat. No. 2,795,564, which discloses the applicability of many acrylic polymers in the making of water-based paints. As pointed out in that patent, the polymer obtained in aqueous dispersion by emulsion polymerization of one or more monoethylenically unsaturated monomers (having a group $H_2C=C<$) may have an apparent second order transition temperature, or glass transition temperature which depends upon the components and the proportion of such components in the polymer. The patent points out that certain of this type of monomer, such as methyl methacrylate, (styrene, vinyl acetate, vinyl chloride, and acrylonitrile being similar in this respect) tend to produce homopolymers which have relatively high glass transition values, the particular glass transition temperature referred to in that patent being designated by the symbol $T_i$ as defined in the patent. The monomers just referred to, when homopolymerized, produce hard polymers, that is, polymers having a glass transition temperature or $T_i$ value above 20° C. On the other hand, the patent mentions numerous monomers of monoethylenically unsaturated type which produce relatively soft homopolymers, this characterization representing polymers having glass transition temperatures or $T_i$ value of 20° C. or less.

The patent referred to discloses that by copolymerizing various hard and/or soft monomers in predetermined proportions, a copolymer can be obtained having a predetermined glass transition temperature or $T_i$ value in a wide range from well below −40° C. up to 150° C. or higher. Coatings made from aqueous dispersions of the various polymers may be such that application of the coating compositions or aqueous-based paints made from such polymers can be effected at normal room temperature or even lower with expectation of good film-forming qualities if the $T_i$ value of the particular polymer involved is not above the ambient temperatures at which the coating is performed. For example, coatings made from aqueous-based paints containing a polymer having a $T_i$ value of about 15° C. generally can be applied at room temperatures and result in good film formation simply by drying of the coated film in the ambient atmosphere. On the other hand, if the coating composition contains as its primary film-forming component an emulsion polymer having a $T_i$ value above room temperatures, such as from about 35° C. and up, the coated film obtained from such a paint may require elevated temperatures, such as 35° C. and up, during drying in order to assure that the polymer particles are adequately coalesced or fused into a continuous coherent film during the drying. Some polymers may be characterized by a glass transition temperature substantially above room temperature such as up to 30°–35° C. but still would be capable of forming a continuous film at normal room temperatures because of an affinity for water (hydrophilicity) of a particular polymerized unit in the dispersed polymer particles. An example of such a monomeric component is vinyl acetate. The hydrophilicity of polymer as a result of its content in substantial amount of vinyl acetate (or equivalent monomer) aids in coalescing the polymer particles into a continuous film at temperatures lower than the $T_i$ value of such polymer as determined by a standard test.

The making of water-based paints with polymers having low $T_i$ values to enable the aqueous-based paint to be applied at normal room temperatures without the use of a plasticizer results in films which in many cases are inadequately hard and tough after drying. On the other hand, the use of polymers having high glass transition temperatures substantially above room temperature such as above 35° C. generally requires the presence of a permanent or fugitive plasticizer (the plasticized polymer having a lower $T_i$ value) or a high temperature of drying in order to provide good continuous films on the surfaces coated.

Copending U.S. application Ser. No. 664,597, filed Mar. 8, 1976, now abandoned, discloses the incorporation of dicyclopentenyl acrylate or dicyclopentenyl methacrylate as a coalescent in such aqueous film-forming polymer dispersions, these compounds being individually designated DCPA and DCPMA respectively, and generically as DCP(M)A. However, these compounds, in spite of their low volatility, have an odor that is quite characteristic, pervasive, persistent, and objectionable under certain conditions when put into use by certain operating personnel. They are also too volatile for use in certain aqueous finishes, especially those used or applied industrially, which require baking at elevated temperatures. DCP(M)A also tends to produce extremely hard and brittle products which may require plasticizers.

In accordance with the present invention, these disadvantages have been practically overcome by addition of a monomeric material of formula I hereinafter to aqueous coating compositions, such as water-based paints, prepared from aqueous dispersions of vinyl addition polymers including water-soluble addition polymers dissolved therein and water-insoluble addition polymers dispersed therein as insoluble particles of minute size, e.g. from 0.1 to 5 or 10 microns average diameter, such as those obtainable by emulsion polymerization. The use of these compounds provides a versatility to such compositions not heretofore obtained without great trouble and expense, as explained hereinafter.

The compounds used in the present invention are the ester-ether compounds of the general formula I following:

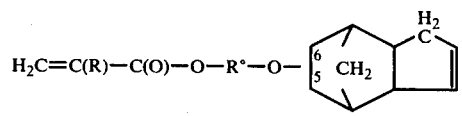

wherein R is H or $CH_3$, and

R° is an alkylene group having 2 to 12, preferably 2 to 6, carbon atoms or an oxaalkylene group having at least 4 to 12 carbon atoms and having one or more oxygen atoms joining distinct segments of the alkylene groups, each such segment having at least two carbon atoms.

R°, in preferred embodiments, represents the alkylene or oxaalkylene group of a ($C_2$ to $C_6$)-diol or of a ($C_2$ to $C_6$)-glycol containing one or two oxygen atoms joining 2- or 3-carbon atom segments of the alkylene groups. The ester-ether chain may be connected to either the 5-position or the 6-position of the ring nucleus as indicated in the general formula I. In fact, the product may comprise a mixture of the two compounds in one of which the ester-ether chain is substituted in the 5-position and in the other of which the ester-ether chain is substituted in the 6-position.

The monomers of formula I may be prepared by first reacting dicyclopentadiene with excess diol, using an acid catalyst to produce an intermediate ether (hydroxy-R°-O-dicyclopentadiene) and then esterifying the hydroxyl of the intermediate with acrylic or methacrylic acid, using an acid catalyst, such as sulfuric acid, p-toluenesulfonic acid, and boron trifluoride. Examples of diols include ethylene glycol, propylene glycol, neopentyl glycol, 1,3-butylene glycol, 1,6-hexanediol, diethylene glycol, dipropylene glycol, and triethylene glycol. The monohydroxyglycol ester obtained in the first step is preferably isolated, as by distillation, and then is esterified with acrylic or methacrylic acid, using an acid catalyst. Instead, the second step may be an acylation of the mono-ether with (meth)acrylic acid chloride or anhydride or a transesterification with a simple ester, such as methyl (meth)acrylate, in the presence of a neutral or basic catalyst. Processes for the preparation of the monomers are disclosed in copending U.S. application for patent Ser. No. 703,348, filed July 7, 1976, now U.S. Pat. No. 4,097,677, and the disclosure therein is incorporated herein by reference.

In accordance with the present invention, it has been found that the addition of a non-volatile reactive monomer of formula I above to coating compositions based on vinyl addition polymers of monoethylenically unsaturated monomers, particularly those having a terminal group $H_2C=C<$, is extremely valuable and useful for the purpose of favoring the ease of coating, facility of film-forming action during drying at normal room temperatures and also by rendering the coated film of greater hardness and toughness as a result of the reactive, air-curing characteristics of the monomer of formula I above. In general, a small amount of a drier or siccative, by which is meant the type of salt or complex of a polyvalent metal that is commonly employed to hasten the oxidation of drying oils, may be added to accelerate the curing of the coating film during drying. The proportion of formula I monomer in the coating composition may fall within a wide range depending upon the particular composition, its components and particularly the content of film-forming polymer therein and its apparent second order transition temperature.

When added to an emulsion polymer dispersion, the formula I monomer plays a role that is quite advantageous. Like DCP(M)A, it can serve as a coalescent in that it acts as a plasticizer for the dispersed polymer particles. If the dispersed polymer has a $T_i$ that is above room temperature, e.g., 35° C., so that coating compositions, such as water-base paints, made from the polymer dispersion would ordinarily not form a continuous film on drying at ambient conditions, enough formula I monomer can be mixed into the polymer dispersion or coating composition containing such polymer dispersion to lower the $T_i$ and the effective film-forming temperature sufficiently to enable the coatings obtained on coating the compositions to form continuous films at ambient temperature. At the same time, on air-drying of the films the product becomes hard and block-resistant because of the autoxidizable nature of the composition. However, an ester-ether of formula I has an advantage over DCP(M)A in that it does not have an objectionable (or even a detectable) odor that might bother operator personnel who prepare the compositions and/or persons who use them under most conditions of preparation and use. Even those compositions which are subjected to elevated temperatures during preparation or use, such as in applying the compositions in atmospheres of high temperature or subjecting coated or impregnated articles to baking temperatures as high as 150° C. or even higher, emit little or no objectionable odor because of the extremely low volatility of the formula I monomer. By virtue of the extra "O—R°" present in the formula I compounds herein as compared to DCP(M)A, the extremely low volatility is apparently obtained. In addition, the extensive variation in the specific composition of the radical R° provides a factor by which the combination of hardness (brittleness) and softness (toughness) in the cured product can be varied widely. The selection of R° and R can be made to correlate with the particular film-forming polymer in the aqueous polymer system to provide a wide range of properties in the final product. Thus, the compounds of formula I provide versatility that allows a wider array of applications of polymer dispersions in which one prefers not to replace a polymer of one constitution with a polymer that has a different compositional structure.

Similarly, when the formula I monomer is added to coatings based on an aqueous dispersion of an emulsion polymer having a low $T_i$ such that film-formation at room temperature would occur without the formula I monomer, the films obtained from the formula I monomer-containing polymer composition are hardened and toughened upon the air-curing of the formula I monomeric contents thereof.

The coating compositions preferably contain one or more siccatives or driers. The drier used is any polyvalent metal-containing complex or salt that catalyzes the oxidative curing of drying oils or drying oil-modified alkyd resins. Examples of the driers are various polyvalent metal salts including calcium, copper, zinc, manganese, lead, cobalt, iron and zirconium as the cation. Simple inorganic salts are useful such as the halide, chloride, nitrate, sulfate. Salts of organic acids such as the acetylacetonate, acetate, propionate, butyrate and the like are also useful. The driers may also be complex reaction products of metal oxides, acetates, or borates and vegetable oils. Useful driers also include salts of naphthenic acids or of $C_8$ to $C_{30}$) aliphatic acids. Examples of the aliphatic or fatty acid component or anion of the drier salt is that of naphthenic acids, resinic acids, (that is, rosin acids), tall oil fatty acids, linseed oil fatty acids, 2-ethylhexoic acid, lauric acid, palmitic acid, myristic acid, stearic acid, oleic acid, linoleic acid, linolenic acid, behenic acid, cerotic acid, montanic acid, and abietic acid. Preferred drier salts are those of cobalt and manganese, such as cobalt octoate, cobalt naphthenate and manganese octoate and naphthenate. Mixtures of various driers may be used. The driers mentioned in "Encyclopedia of Chemical Technology," Kirk-Othmer, Volume 5, pages 195–205, published by Interscience Encyclopedia, Inc., N.Y. (1950) may be used.

The proportion of the drier may be quite low and it is generally used in the amount of 0.0005 to 2% metal content by weight of the formula I monomeric material. The drier may be added to the composition prior to storage provided such addition is made in the absence of oxygen or a volatile stabilizer is included in the composition to inhibit or prevent the oxidizing action of the drier and the composition is placed in closed storage containers to prevent volatilization of the inhibitor.

Thus, a volatile stabilizer may be used in coating compositions containing a reactive monomer of formula I to prevent adventitious polymerization thereof in the formulated composition at any time prior to film formation. The fugitive stabilizer must exhibit sufficient volatility in thin films so as to not retard the development of film properties to any appreciable extent. The stabilizer may be used in a small proportion of 0.1% to 2% by weight based on the weight of the formula I monomer component. The stabilizer is generally a volatile ketone-oxime obtained from ketones having 3 to 10 carbon atoms or an aldehyde-oxime derived from aldehydes having 1 to 10 carbon atoms. Specific examples are methyl ethyl ketone-oxime, methyl butyl ketone-oxime, 5-methyl-3-heptanone-oxime, cyclohexanone-oxime, and butyraldehyde-oxime. Addition of such inhibitors is essential if long stability and pot life of the aqueous compositions containing dispersed polymer formula I monomer and drier are desired.

While the compositions of the present invention comprising an aqueous dispersion of a vinyl-type addition polymer, a formula I monomer, a drier, and a volatile oxime have characteristic rapid development of tack-free cure of the film by autoxidation, the rate of cure can be accelerated by replacing a part of the formula I monomer with a drying oil fatty acid or a salt thereof, such as the ammonium or alkali metal (e.g. sodium, potassium or lithium) salt. Since the aqueous coating compositions of the present invention, especially the pigmented types, such as water base paints, contain dispersing agents, the drying oil fatty acid may be in the form of alkaline earth salts, e.g. calcium or magnesium, but ordinarily the ammonium or alkali metal salts are preferred. The extent of acceleration obtainable in this way depends on the proportion of the formula I monomer that is replaced by the drying oil fatty acid and while there may be as much as one-third or more replacement by such fatty acid, generally a replacement of from 1% to 25% by weight of the ether-ester monomer of formula I provides quite a practical operating range, and preferably 5% to 10% replacement is the most useful. Examples of drying oil fatty acids include; linoleic, linolenic, linseed oil fatty acids, tung oil fatty acids, tall oil fatty acids, soyabean oil fatty acids, dehydrated castor oil fatty acids, etc. Since the coating compositions are often alkaline, the fatty acid may be in salt form, especially as the ammonium salt.

The coating compositions may contain, of course, other materials as pointed out in the patent referred to earlier including pigments, dispersing agents, sequestering agents, defoaming agents, humectants, thickeners, bactericides, fungicides, odor-modifying agents, and other resinous materials in dispersed forms. The various pigments and other materials that are mentioned in the earlier patent may be used.

In general, the proportion of formula I monomeric material that is used in the coating composition may be from about 1% to 200% by weight, preferably 5% to 150% based on the weight of the vinyl addition polymer constituting the main film-forming component of the coating composition. It is to be understood that the acrylic polymers described in Conn et al, 2,795,564, mentioned hereinabove, are not the only types of vinyl addition polymers that can be modified and improved by the inclusion of the formula I monomer with a drier. In the copolymer systems of the patent, the hardening component is a lower methacrylate, such as methyl methacrylate, but similar copolymer systems in which the hard lower methacrylate is partly or completely replaced by such hardening monomers as styrene, vinyltoluene, acrylonitrile, methacrylonitrile, vinyl chloride, vinylidene chloride, or vinyl acetate are also improved by the inclusion of formula I monomer and a drier. It has been found that the formula I monomer is also useful in conjunction with aqueous coating systems based on natural latices or synthetic latices produced from butadiene, chloroprene, styrene/butadiene copolymers, acrylonitrile-butadiene-styrene copolymers and related synthetic rubber systems which have low $T_i$ values. Films obtained from these dispersions are also improved in respect to hardness by the incorporation of a formula I monomer with a drier.

The use of a reactive monomer of formula I makes it possible to obtain hard, tough coating films from coating compositions which comprise a polymer having a low $T_i$ (which would normally form a soft film). The benefits can be obtained without the use of a plasticizer or with a greatly reduced amount of permanent plasticizer in the compositions.

The incorporation of formula I monomer in coating compositions is not restricted to those in which the film-forming component comprises or consists essentially of water-insoluble dispersed particles of a polymer or copolymer. It is also useful in conjunction with aqueous solutions of vinyl addition polymers wherein the solubility of the polymer is essentially true solubility by virtue of low molecular weight of the polymer containing hydrophilic groups as well as those characterized by the formation of colloidal solutions.

The soluble polymers may derive their solubility from a large content of hydrophilic groups such as acid mers which can be in acid or in salt form. Examples of such acids include acrylic acid, methacrylic acid, crotonic acid, itaconic acid, maleic acid, citraconic acid, aconitic acid, and the like. The salts may be those of ammonia, amines, such as dimethylaminoethanol, triethylamine, 2-amino-2-methyl-1-propanol, and the like, or an alkali metal, especially sodium, potassium or lithium. Besides polymers containing large proportions of acid units such as poly-acrylic acid, polymethacrylic acid, or copolymers such as copolymers of 15% methacrylic acid and 85% butyl methacrylate, there may be used copolymers containing a large proportion of acrylamide or methacrylamide units or polymers containing a large proportion of amine units such as homopolymers of oxazolidinylethyl acrylate or copolymers of the latter amine-containing polymer with up to 20% by weight of methyl acrylate. Water-solubility may also be derived from polymerized mers containing hydroxyl groups, such as hydroxyethyl acrylate or methacrylate, 2-hydroxypropyl acrylate, 3-hydroxypropyl acrylate. Water-solubility can also be the result of copolymerization of two or more types of the hydrophilizing monomers mentioned herein. The use of a formula I monomer with a drier in these instances serves to modify the character of the final coating film.

The use of the formula I monomer in the coating compositions serves several functions or purposes. In aqueous solutions of water-soluble polymers it aids the adjustment of viscosity to facilitate coating without the necessity to dilute the solution excessively with water or other water-miscible volatile solvent. The formula I monomer then becomes part of the binder component on air-drying and contributes to the solvent-resistance, water-resistance, alkali-resistance, gloss, hardness, and toughness of the cured coating films. In coating compositions based on aqueous dispersions of water-insoluble polymer particles, e.g., obtainable by emulsion polymerization, the formula I monomer serves as a coalescent, hardener, toughener, viscosity-controlling aid, and so on. In all cases, the formula I monomer, in air-dry curing of the coating compositions containing the vinyl polymer, formula I monomer, and drier, becomes part of the binder in the final cured coating films. Avoidance of volatile organic solvents also reduces pollution.

The non-volatile, reactive component may, and preferably does, consist essentially of formula I monomeric material but, if desired, it may comprise a mixture of at least a major proportion (e.g. 51% to 99% by weight) thereof and a minor proportion of other non-volatile receive ethylenically unsaturated monomeric material selected from (1) a higher ($C_{10}$–$C_{20}$)aliphatic ester of acrylic or methacrylic acid, e.g. ($C_{10}$–$C_{20}$)alkyl and ($C_{10}$–$C_{20}$)alkenyl acrylates and methacrylates, and (2) a vinyl ester of a higher ($C_{10}$–$C_{20}$) aliphatic acid, or a minor proportion of non-volatile, reactive di-($C_1$–$C_8$)alkyl maleates, fumarates, and itaconates. Optionally, to improve water-, solvent-, abrasion-, and blocking-resistance, the non-volatile reactive formula I monomer-containing material may also comprise a small amount up to 30%, preferably 2 to 20%, by weight, based on binder weight, of a polyethylenically unsaturated material, such as glycol or polyol (meth)acrylates, e.g. ethylene glycol di(meth)acrylate, 1,4-butanediol di(meth)acrylate, 1,6-hexane diol di(meth)acrylate, 1,3-butylene glycol dimethacrylate, neopentyl glycol di(meth)acrylate, pentaerythritol tri- and tetra-(meth)acrylate, trimethylolpropane trimethacrylate; also allyl-(meth)acrylates. Examples of the esters (1) are decyl acrylate, isodecyl acrylate, undecyl acrylate, lauryl acrylate, cetyl acrylate, pentadecyl acrylate, hexadecyl acrylate, octadecyl acrylate, the corresponding methacrylates, and the unsaturated analogs, such as oleyl acrylate or methacrylate, linoleyl (meth)acrylate, linolenyl (meth)acrylate, and so on. Examples of (2) are vinyl decanoate, vinyl laurate, vinyl oleate, vinyl palmitate, vinyl myristate, and vinyl stearate. Examples of the diesters include dimethyl, diethyl, dibutyl, dihexyl, and di-(2-ethylhexyl) maleate, fumarate, and itaconate.

In the following examples, which are illustrative of the invention, the parts and percentages are by weight and the temperatures are in C° unless otherwise noted. Also, the various latices of emulsion copolymers used are:

Latex A - copolymer of 42.5 EA/56.5MMA/1.0MAA, neutralized with ammonia to a pH of about 9.5, 47% solids, $T_i$ about 41° C., particle size about 0.1 micron.

Latex B - copolymer of 35BA/64MMA/1MAA, pH of 9(NH$_3$), 45% solids, $T_i$ about 38° C., particle diameter about 0.15 micron, Latex C - copolymer of 45.6BA/53.4MMA/1MAA, pH of 9(NH$_3$), 45% solids, $T_i$ about 24° C., particle diameter about 0.15 micron.

Latex D - copolymer of 54.7BA/43.8MMA/1.5MAA, pH of 9(NH$_3$), 45% solids, $T_i$ of 13° C.

Latex E - copolymer of 85% vinyl acetate and 15% butyl acrylate, 45% solids, $T_i$ about 15° C., pH of 4.

Latex F - copolymer of 40% vinyl acetate, 37% butyl acrylate and 23% vinyl chloride, 45% solids, $T_i$ about 15° C., pH of 4, and Latex G - copolymer of 18BA/81.5MMA/0.5MAA, neutralized to about 9.2 pH by trimethylamine, 37.3% solids, $T_i$ of 60° C., particle diameter about 0.1 micron. NOTE: EA = ethyl acrylate, BA = butyl acrylate, MMA = methyl methacrylate, and MAA = methacrylic acid, the proportions in the copolymer being weight proportions or weight ratios.

In some of the examples hereinafter, comparisons are made with conventional non-reactive materials heretofore used as latex polymer coalescents, such materials being referred to herein as "fugitive" coalescents because of their tendency to evaporate, even though slowly, in contrast with the coalescent materials of the present invention. These nonreactive, fugitive coalescents include:

2,2,4-trimethyl-1,3-pentanediol monoisobutyrate hereinafter designated TPM 2-butoxyethanol hereinafter designated BE. n-butoxypropanol hereinafter designated BP. acetate of the butyl ether of diethylene glycol hereinafter designated BDA.

EXAMPLE 1

Dicyclopentenyloxyethyl methacrylate (hereinafter designated "Monomer 1a") is added gradually with stirring to Latex A in a proportion of 40% on latex solids. Cobalt (II) acetylacetonate (0.2% metal on latex solids plus monomer) and methyl ethyl ketone oxime (0.26% on latex solids plus monomer) stabilizer are added and the mixture is stirred overnight to ensure complete solubilization of the metal drier.

TPM is added similarly to another sample of Latex A in a proportion of 20% on latex solids.

Films are cast at room temperature and Table I shows hardness development as a function of time.

TABLE I

| | Room Temperature Knoop Hardness Number (KHN) Development | | | |
|---|---|---|---|---|
| | 64 hr. | 72 hr. | 88 hr. | 9 days |
| Latex containing 40% Monomer 1a | 4.5 | 4.1 | 5.1 | 6.0 |
| Latex containing 20% TPM | 0.3 | 0.4 | 0.4 | 0.4 |

With the fugitive coalescent TPM and because of its slow evaporation, this latex film requires several weeks up to months at ambient temperature to develop full hardness (KHN = 4–5). In contrast, with the autoxidatively curable coalescent (Monomer 1a), hardness development is much more rapid and the ultimate hardness of the film is increased (KHN = 6–7). Further, Monomer 1a imparts no odor to the formulation.

EXAMPLE 2

Monomer 1a is further tested as a convertible latex coalescent versus the fugitive coalescents TPM, BE and BP in Latices B and C, neither of which without a coalescent forms a coherent film at room temperature. In respect to this latter characteristic, Latices B and C are like Latex A.

The fugitive coalescents are added with stirring to portions of each latex at levels of 10 and 20 weight percent based on latex solids.

To other portions of each latex Monomer 1a is added with stirring at levels of 10, 20, and 40 percent. Cobalt (II) acetate (0.1% metal based on weight of monomer and latex solids), 70% aqueous t-octylphenoxypoly(3-9)ethoxyethanol (1% on latex solids), and methyl ethyl ketoxime (0.25% on monomer and latex solids) are then added with thorough stirring. A similar set of Monomer 1a-containing latex preparations is made but with the cobalt and oxime omitted. Films are cast at room temperature on aluminum test panels to yield a dry film thickness of about 2.2 mils. Table II shows the hardness development with time, impact resistance, and cheesecloth print resistance (wherein, at 140° F., cheesecloth is placed against the film under a pressure of 2 lbs. per square inch for 1 hr.). The print resistance is measured after two weeks at ambient conditions and rated from 10 = no print to 0 = very heavy print.

With the commonly used coalescent TPM, development of hardness and print resistance is exceedingly slow, as is also the case with uncatalyzed Monomer 1a. Use of the more volatile BE and BP confers significantly more rapid property development. However, use of Monomer 1a with cobalt catalyst and oxime stabilizer not only confers excellent property development to the coating but does so without wastage of raw materials and without pollution and exposure of personnel to solvent vapors.

EXAMPLE 4

Comparable results are obtained when Examples 1, 2, and 3 are repeated, substituting for monomer 1a, a corresponding proportion of each of the following monomers of formula I hereinabove, the chemical name of the monomer in each instance being given a short designation for reference hereinafter:

(a) Dicyclopentenyloxyethyl acrylate (Monomer 1b)
(b) Methacrylate ester of neopentyl glycol monodicyclopentenyl ether (Monomer 2)
(c) Acrylate ester of neopentyl glycol monodicyclopentenyl ether (Monomer 3)
(d) Methacrylate ester of 1,2-propylene glycol monodicyclopentenyl ether (Monomer 4)
(e) Acrylate ester of 1,2-propylene glycol monodicyclopentenyl ether (Monomer 5)
(f) Methacrylate ester of 1,3-butylene glycol monodicyclopentenyl ether (Monomer 6)
(g) The acrylate ester corresponding to the methacrylate of f) above (Monomer 7)
(h) Dicyclopentenyloxyhexyl acrylate (Monomer 8)
(i) Dicyclopentenyloxyhexyl methacrylate (Monomer 9)
(j) Dicyclopentenyloxyethoxyethyl methacrylate (Monomer 10)
(k) Dicyclopentenyloxyethoxyethyl acrylate (Monomer 11)

All of these monomers of formula I exhibit the same autoxidizable characteristic in the presence of a siccative and air or oxygen while having at least as low a vapor pressure as Monomer 1a.

TABLE II

| | Knoop Hardness Number | | | Impact, in-lb | |
|---|---|---|---|---|---|
| | 1 day | 7 days | 16 days | Direct/Reverse | Print Res., |
| Latex B | | | | | |
| Coalescent | | | | | |
| 1) TPM, 10% | 0.79 | 1.01 | 0.79 | 10/4 | 4 |
| 2) TPM, 20% | <0.03 | 0.30 | 0.39 | >50/>50 | 2 |
| 3) BE, 20% | 1.14 | 2.46 | 4.80 | 6/<2 | 6 |
| 4) BP, 20% | 2.02 | 3.57 | 5.01 | — | 6 |
| 5) Monomer 1a, 10% | 0.75 | 0.95 | 1.01 | 6/<2 | 4 |
| 6) Monomer 1a, 20% | <0.30 | 0.30 | 0.30 | >50/>50 | 2 |
| 7) Monomer 1a, 40% | tacky | 0.30 | 0.30 | >50/>50 | 0 |
| 8)* Monomer 1a, 10% | 0.75 | 0.95 | 4.80 | 4/<2 | 4 |
| 9)* Monomer 1a, 20% | <0.30 | 4.48 | 7.01 | 4/<2 | 7 |
| 10)* Monomer 1a, 40% | tacky | 5.54 | 8.34 | 4/<2 | 5 |

*Samples 8-10 contain Co (II) and methyl ethyl ketoxime

| | 1 day | 7 days | 16 days | Direct/Reverse | Print Res., |
|---|---|---|---|---|---|
| Latex C | | | | | |
| Coalescent | | | | | |
| 11) TPM, 10% | <0.30 | 0.30 | 0.41 | >50/>50 | 2 |
| 12) TPM, 20% | <0.30 | 0.30 | 0.30 | >50/>50 | 1 |
| 13) BE, 10% | 0.61 | 0.86 | 1.09 | 27/14 | 5 |
| 14) BE, 20% | 0.45 | 0.80 | 1.19 | >50/28 | 5 |
| 15) BP, 10% | 0.82 | 0.80 | 1.01 | 26/12 | 5 |
| 16) BP, 20% | 0.57 | 0.81 | 0.85 | 40/18 | 2 |
| 17) Monomer 1a, 10% | <0.30 | 0.30 | 0.30 | >50/>50 | 3 |
| 18) Monomer 1a, 20% | tacky | 0.30 | 0.30 | >50/>50 | 0 |
| 19) Monomer 1a, 40% | tacky | 0.30 | 0.30 | >50/>50 | 0 |
| 20)* Monomer 1a, 10% | <0.30 | 0.65 | 1.81 | 20/20 | 4 |
| 21)* Monomer 1a, 20% | tacky | 0.75 | 1.16 | 12/18 | 5 |
| 22)* Monomer 1a, 40% | tacky | 0.86 | 1.52 | 10/4 | 4 |

*Samples 20-22 contain Co (II) and methyl ethyl ketoxime

EXAMPLE 3

Although the novel coatings of Example 2 containing monomer 1a and cobalt catalyst exhibit an excellent rate of property development, this rate can be further accelerated by formulating with low levels of drying oil fatty acids. Thus, the tack-free time of coating 9 of Table II is reduced from about 24 hours to about 16 hours and about 8 hours respectively by replacement in part of monomer 1a with 5 and 10 percent of either tung oil fatty acid or linseed oil fatty acid.

EXAMPLE 5 — SEMIGLOSS PAINTS OF HARD LATEX COPOLYMERS

A pigment paste is prepared by mixing and grinding (e.g. in a Cowles dissolver at 3500 fpm for 20 minutes) the following materials in the specified weight proportions:

|  | Parts |
|---|---|
| Dispersant (an ammonium salt methacrylic acid copolymer) | 7.48 |
| Defoamer (Nopco NDW) | 2.00 |
| Propylene glycol | 59.8 |
| Rutile TiO$_2$ | 269.6 |

The resulting pigment dispersion is then let-down with the following materials (Table III) depending on the paint prepared:

TABLE III

| MATERIAL | PARTS in PAINT No. | | | |
|---|---|---|---|---|
|  | 1 | 2 | 3 | 4 |
| Propylene glycol | 57.8 | 57.8 | 57.8 | 57.8 |
| Latex B (45% solids) | 578 | 578 | — | — |
| Latex C (45% solids) | — | — | 578 | 578 |
| Preservative (Super-Ad-It) | 1.0 | 1.0 | 1.0 | 1.0 |
| Water | 15.2 | 15.2 | 15.2 | 15.2 |
| Coalescent |  |  |  |  |
| TPM | 25.9 | — | 25.9 | — |
| Monomer 1a | — | 98.4 | — | 98.4 |
| Linseed oil fatty acid | — | 5.2 | — | 5.2 |
| Methyl ethyl ketoxime | — | 0.9 | — | 0.9 |
| Surfactant¹ (64%) | 2 | 2 | 2 | 2 |
| Thickener (Natrosol 250 MR²*) | 63.0 | 63.0 | 63.0 | 63.0 |
| Co II acetate (2.37% Co II) | — | 15.0 | — | 15.0 |

¹dioctyl sodium sulfosuccinate
²*2.5% aqueous hydroxyethyl cellulose

After mixing the paints, they are adjusted to pH of 9.6 by addition of ammonium hydroxide.

The paints are applied to aluminum panels to yield a dry film thickness of 1.5–2.0 mils. The development of film hardness (Knoop Hardness Number), and specular gloss are followed with time and are shown in Table IV.

The coatings containing Monomer 1a, cobalt, and oxime exhibit good gloss and wet state stability. Hardness development is excellent, and, moreover, the coatings do not waste raw materials and are non-polluting.

TABLE IV
PROPERTY DEVELOPMENT OF PIGMENTED COATING COMPOSITIONS

| Property | Paint No. | | | |
|---|---|---|---|---|
|  | 1 | 2 | 3 | 4 |
| Specular Gloss |  |  |  |  |
| 60° | 69 | 63 | 67 | 65 |
| 20° | 25 | 22 | 23 | 25 |
| Knoop Hardness Number |  |  |  |  |
| Ambient temp. 8 days | 2.07 | 7.82 | 0.46 | 0.76 |
| Ambient temp. 14 days | 2.16 | 6.52 | 0.74 | 1.70 |
| Viscosity (Krebs Units¹) |  |  |  |  |
| initial | 69 | 67 | 75 | 68 |
| room temp. (10 days) | 82 | 74 | 72 | 60 |
| 140° F (10 days) | 114 | 55 | 88 | 69 |
| freeze-thaw (5 cycles) | 80 | 67 | 69 | 64 |

¹after 15 min. shear cycle on a Red Devil paint can shaker.

EXAMPLE 6

Latex E and Latex F above are formulated using the conventional fugitive coalescent TPM and Monomer 1a for comparison. The coalescents (10, 20, or 30% by weight on latex solids) are slowly added to the latex copolymers with stirring. Where herein indicated, Co(II) acetate (0.10% metal on latex solids and monomer) is added with thorough stirring. Films are cast on aluminum test panels and allowed to dry at room temperature to give a dry film thickness of about 1.7 mils. The latex copolymers even without coalescent form apparently continuous films at room temperature. The development of film hardness and cheesecloth print resistance is shown in Table V.

TABLE V

| Coalescent | Knoop Hardness Number | | | | Print* |
|---|---|---|---|---|---|
|  | 1 day | 3 day | 7 day | 14 day |  |
| Latex E |  |  |  |  |  |
| TPM, 10% | <0.10 | <0.10 | 0.13 | 0.13 | 1 |
| Mon. 1a, 10%, Co$^{II}$ | <0.10 | 0.23 | 0.27 | 0.28 | 3 |
| Mon. 1a, 20%, Co$^{II}$ | <0.10 | 0.35 | 0.44 | 0.41 | 3 |
| Mon. 1a, 30%, Co$^{II}$ | <0.10 | 0.38 | 0.35 | 0.47 | 4 |
| None | 0.26 | 0.33 | 0.32 | 0.32 | 3 |
| Latex F |  |  |  |  |  |
| TPM, 10% | <0.10 | 0.16 | 0.18 | 0.17 | 2 |
| Mon. 1a, 10%, Co$^{II}$ | <0.10 | 0.16 | 0.27 | 0.25 | 3 |
| Mon. 1a, 20%, Co$^{II}$ | <0.10 | 0.21 | 0.34 | .28 | 3 |
| Mon. 1a, 30%, Co$^{II}$ | <0.10 | 0.20 | 0.47 | 0.38 | 3 |
| None | 0.17 | 0.52 | 0.40 | 0.31 | 4 |

*Measured after 2 weeks drying; at 25° C. under 2 psi for 24 hours.

The coatings containing the conventional fugitive coalescent required for film formation at temperatures below normal room temperature remain tacky through two weeks. In contrast, the coating compositions containing Monomer 1a yield tack-free films within 2–3 days. In addition, the hardness development and print resistance developed by the films containing Monomer 1a is comparable to or even better than that of films obtained without added coalescents.

EXAMPLE 7 — LOW TEMPERATURE BAKING LATEX POLYMER COATINGS

Monomer 1a is used as a coalescent and compared with the fugitive coalescent TPM in Latex B using short time baking at moderately elevated temperatures to accelerate cure. The coatings are prepared by mixing, in the order given:

|  | Composition No. | | |
|---|---|---|---|
|  | 1 | 2 | 3 |
| Latex B (45%) | 27.8 | 27.8 | 27.8 |
| Triton X-405 (70%) | 0.27 | 0.27 | 0.27 |
| Monomer 1a | 5.0 | 5.0 | — |
| TPM | — | — | 5.0 |
| Cobalt acetate (10% aqueous) | 0.74 | — | — |

The freshly prepared coatings are cast on test panels and evaluated for hardness at several times after various cure conditions as given below:

| Comp. No. | Cure | Tukon Hardness after: | | |
|---|---|---|---|---|
|  |  | 2 hours | 24 hours | 48 hours |
| 1 | 180° F/60 min. | 3.3 | 2.6 | 5.1 |
|  | 120° F/60 min. | 0.3 | 1.4 | 4.0 |
|  | Room Temp. | <0.2 | 0.2 | 2.8 |
| 2 | 180° F/60 min. | 0.4 | 1.1 | 0.8 |
|  | 120° F/60 min. | 0.2 | 0.2 | 0.2 |
|  | Room Temp. | <0.2 | <0.2 | 0.2 |
| 3 | 180° F/60 min. | 1.9 | 1.6 | 2.4 |
|  | 120° F/60 min. | 0.4 | 0.4 | 0.5 |
|  | Room Temp. | <0.2 | 0.2 | 0.3 |

The system containing monomer 1a with cobalt catalyst has excellent response to accelerated cure at elevated temperature and without wastage of raw materials and pollution of the environment.

EXAMPLE 8 — COATING COMPOSITIONS COMPRISING A SOFT ACRYLIC LATEX COPOLYMER

Monomer 1a is tested as a latex coalescent in Latex D which is capable of forming a film at room temperature without the use of a coalescent. The latex is formulated variously with TPM (fugitive coalescent) and Monomer 1a with cobalt acetate catalyst (0.1% metal on latex solids plus monomer). The freshly prepared compositions are cast on steel test panels to yield 1.7 mil films when dry and, after one and two weeks at room temperature, they are tested for hardness and cheesecloth print resistance with the results shown in Table VI. Monomer 1a confers significantly improved hardness and print resistance to the films of soft latex.

TABLE VI

| Coalescent | Knoop Hardness | | Print Resistance* | |
|---|---|---|---|---|
| | 1 week | 2 weeks | 1 week | 2 weeks |
| None | 0.18 | 0.24 | 4 | 4 |
| TPM, 10% | 0.24 | 0.23 | 4 | 4 |
| Mon. 1a, 10% | 0.42 | 0.34 | 7 | 7 |
| Mon. 1a, 20% | 0.84 | 0.58 | 7 | 6 |
| Mon. 1a, 30% | 1.15 | 1.06 | 8 | 7 |

*25° C., 2 psi for 24 hrs.

EXAMPLE 9

Monomer 1a is used in Latex G as a convertible latex coalescent to yield a hard, rapidly air-drying, non-polluting latex coating vehicle and is compared to a similar coating employing BDA as fugitive coalescent. $T_i$ of the latex polymer is 60° C. and it is incapable of forming a film at room temperature without coalescent. Coating compositions are prepared by mixing, in the order given:

| | 1 | 2 | 3 |
|---|---|---|---|
| Latex G (37.3%) | 26.8 | 26.8 | 26.8 |
| Water | 6.5 | 6.5 | 6.5 |
| Surfactant* (70%) | 0.86 | 0.86 | 0.86 |
| Monomer 1a | 4.0 | 4.0 | — |
| BDA | — | — | 4.0 |
| Cobalt acetate (10% aqueous) | 0.59 | — | — |

*t-octylphenoxypoly(39)ethoxyethanol

The freshly prepared compositions are cast on aluminum test panels to yield 1.8-mil thick films when dry and are evaluated for hardness development with the following results:

| | 1 | 2 | 3 |
|---|---|---|---|
| Knoop Hardness No. | | | |
| 2 days | 16.0 | 0.6 | 3.0 |
| 7 days | 19.2 | 0.9 | 12.7 |
| Print Resistance at 9 days (140° F/1 hr., 2 psi) | 7 | 4 | 6 |

EXAMPLE 10

Examples 5 through 9 are repeated, replacing Monomer 1a with a corresponding proportion of each of the following reactive monomers of formula I:
(1) Monomer 1b.
(2) Monomer 4.
(3) Monomer 5.
(4) Monomer 6
(5) Monomer 8.
(6) Monomer 9.
(7) Monomer 10.
The results obtained are quite comparable with those obtained when Monomer 1a is used. As in all the examples above employing the latter monomer, the incorporation of these other monomers of formula I is free of any odor so that formulators do not encounter this objection to their use.

What is claimed is:

1. A composition adapted to coat and/or impregnate a substrate comprising an aqueous dispersion of a vinyl addition polymer, about 1% to 200% by weight, based on the weight of dispersed polymer, of an ester-ether monomer of formula I herein, and from 0.0005% to 2% by weight, based on the weight of formula I monomer component, of a drier, formula I being as follows:

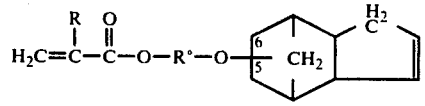

wherein
R is H or CH$_3$, and
R° is an alkylene group having 2 to 12 carbon atoms or an oxaalkylene group having at least 4 to 12 carbon atoms and having at least one oxygen atom joining distinct segments of the alkylene group, each such segment having at least 2 carbon atoms.

2. A composition according to claim 1 comprising 0.1% to 2% by weight, based on the weight of formula I monomer component, of a volatile aldehyde-oxime or ketone-oxime stabilizer.

3. A composition according to claim 1 wherein from 1% to about 33⅓% by weight of the formula I monomer component is replaced by a drying oil fatty acid or a salt thereof.

4. A composition according to claim 1 wherein the vinyl addition polymer is dispersed as water-insoluble particles and has an apparent second order transition temperature in the range of −40° C. to +150° C.

5. A composition according to claim 1 wherein the vinyl addition polymer is dispersed as water-insoluble particles and has an apparent second order transition temperature in the range of 15° C. to 100° C.

6. A composition according to claim 1 wherein the vinyl addition polymer is dispersed as water-insoluble particles and has an apparent second order transition temperature of 15° C. or lower.

7. A composition according to claim 1 in which the polymer contains hydrophilic groups selected from the group consisting of hydroxyl, carboxyl, and amide groups.

8. A composition according to claim 4 wherein the polymer is a copolymer of at least one member selected from the group consisting of methyl methacrylate, acrylonitrile, methacrylonitrile, vinyl chloride, vinylidene chloride, vinyl acetate, styrene, and vinyltoluene and at least one member selected from the group consisting of (C$_1$ to C$_{18}$)alkyl acrylate and (C$_4$–C$_{18}$)alkyl methacrylate.

9. A composition according to claim 8 in which the polymer is a copolymer containing methyl methacrylate units and (C$_1$–C$_4$)alkyl acrylate units copolymerized therein.

10. A composition according to claim 9 in which the copolymer also contains polymerized therein, carboxyl-containing units.

11. A composition according to claim 1 wherein R is CH$_3$.

12. A composition according to claim 1 wherein R is H and R° is ethylene.

13. A composition according to claim 1 wherein R is CH$_3$ and R° is ethylene.

14. A composition according to claim 3 in which the drying oil fatty acid is in the form of its ammonium salt.

15. A composition according to claim 14 comprising 0.1 to 2% by weight, based on the weight of formula I monomer, of a volatile aldehyde-oxime or ketone-oxime stabilizer.

* * * * *

UNITED STATES PATENT AND TRADEMARK OFFICE
CERTIFICATE OF CORRECTION

PATENT NO. : 4,141,868
DATED : February 27, 1979
INVENTOR(S) : WILLIAM D. EMMONS and KAYSON NYI It is certified that error appears in the above-identified patent and that said Letters Patent are hereby corrected as shown below:

Column 7, line 23, "receive" should be "reactive".

Column 9, TABLE II, in the line in the first column beginning "2) TPM, 20%" and in the second column of the TABLE under "1 day," the expression "< 0.03" should be "<0.30".

Column 11, TABLE III, between the lines beginning in the first column under "Material" "Surfactant (64%)" and "Thickener (Natrosol", insert the following line, "Defoamer (Nopco NDW)     2.9    2.9    2.9    2.9".

Signed and Sealed this

*Twenty-seventh* Day of *May 1980*

[SEAL]

*Attest:*

SIDNEY A. DIAMOND

*Attesting Officer*     *Commissioner of Patents and Trademarks*